(12) United States Patent
Sumsion

(10) Patent No.: US 9,414,146 B2
(45) Date of Patent: Aug. 9, 2016

(54) CORD MANAGEMENT AND CLIP SYSTEM FOR WIRELESS AUDIO RECEIVER

(71) Applicant: ZAGG Intellectual Property Holding Co., Inc., Salt Lake City, UT (US)

(72) Inventor: Cecily Sumsion, Draper, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 0 days.

(21) Appl. No.: 14/940,943

(22) Filed: Nov. 13, 2015

(65) Prior Publication Data
US 2016/0080851 A1    Mar. 17, 2016

Related U.S. Application Data

(63) Continuation-in-part of application No. 14/812,761, filed on Jul. 29, 2015.

(60) Provisional application No. 62/031,464, filed on Jul. 31, 2014.

(51) Int. Cl.
*H04R 25/00* (2006.01)
*H04R 1/10* (2006.01)
*H04B 1/3827* (2015.01)

(52) U.S. Cl.
CPC .............. *H04R 1/1033* (2013.01); *H04B 1/385* (2013.01); *H04R 2420/07* (2013.01)

(58) Field of Classification Search
CPC .... H04R 1/1033; H04R 1/10; H04R 2420/07; H01F 7/0263; H04M 1/15; H04B 1/385
USPC ................... 381/374, 385, 395, 370; D8/356; 24/16 PB, 300–306; 248/74.3
See application file for complete search history.

(56) References Cited

U.S. PATENT DOCUMENTS

| | | | |
|---|---|---|---|
| 8,261,416 B2 * | 9/2012 | Rothbaum | F16G 11/14 206/320 |
| D675,505 S * | 2/2013 | Rothbaum | D8/356 |
| D746,663 S | 1/2016 | Rothbaum et al. | |
| D750,956 S | 3/2016 | Rothbaum et al. | |
| 2007/0086617 A1* | 4/2007 | Loh | H04R 1/1033 381/374 |
| 2011/0252606 A1* | 10/2011 | Rothbaum | F16G 11/00 24/302 |

(Continued)

OTHER PUBLICATIONS

Klingg; Magnetic Earphone Cord Holder; Accessed Jun. 3, 2015; 1 page; http://www.klingg.com/.

(Continued)

*Primary Examiner* — Davetta W Goins
*Assistant Examiner* — Phylesha Dabney
(74) *Attorney, Agent, or Firm* — Thorpe, North & Western, LLP

(57) ABSTRACT

A wireless audio receiver comprises a housing with a wireless transceiver and a battery disposed therein. An audio cord comprises an audio wire with a pair of earbuds at one end and an audio connection at an opposite end coupled to the housing. A flexible band is coupled to the housing at a proximal end and extends to a distal free end. A magnetic coupling is between the distal free end of the flexible band and the housing. The flexible band and the housing form a ring for enclosing and securing a portion of the audio cord wound around the housing of the wireless audio receiver and secured by the flexible band. The flexible band and the housing form a clip capable of gripping an article of clothing in the magnetic coupling.

21 Claims, 10 Drawing Sheets

(56) References Cited

U.S. PATENT DOCUMENTS

| | | | |
|---|---|---|---|
| 2015/0121659 A1* | 5/2015 | Bacino | H04R 1/1033 24/16 R |
| 2015/0223573 A1* | 8/2015 | Vecchione | A44B 99/00 24/16 PB |

OTHER PUBLICATIONS

O!Snap; The O!Snap Headphone Holder; Accessed Jun. 3, 2015; 5 pages; https://osnapclip.com/osnap-headphone-holder.

MaCo; Magnetic Cable Organiser; Accessed Jun. 3, 2015; 13 pages; https://www.shopstarter.com/p/492876551/maco-magnetic-cable-organiser.

Magneat; Magneat Cord Manager; Accessed Jun. 3, 2015; 5 pages; https://www.koyono.com/Magneat-Cord-Manager.

Sony: Stereo Bluetooth Headset; Accessed Oct. 27, 2015; http://www.sonymobile.com/global-en/products/accessories/stereo-bluetooth-headset-sbh20/.

Outdoor Tech: Adapt-Bluetooth Headphone Adapter; Accessed Oct. 27, 2015; http://www.outdoortechnology.com/Shop/Adapt/?source=pepperjam&publisherId=21181&clickId=1414615606.

Jabra: Jabra Clipper; Accessed Oct. 27, 2015; http://www.jabra.com/support/jabra-clipper_100-96800000-02.

iPhone Informer: Bluetooth Wireless Earbuds Funded for iPhone; Accessed Oct. 27, 2015; http://www.iphoneinformer.com/8551-bluetooth-wireless-earbuds-funded-for-iphone/.

DIYTrade: iBlue 3 Stereo Bluetooth headset with collar clip style; Accessed Oct. 27, 2015; http://www.diytrade.com/china/pd/9978847/iBlue_3_Stereo_bluetooth_headset_with_collar_clip_style.html.

Overseas Electronics: LG HBM-240 Bluetooth Headset; Accessed Oct. 27, 2015; http://www.welectronics.com/Bluetooth/LG-HBM240.HTML.

* cited by examiner

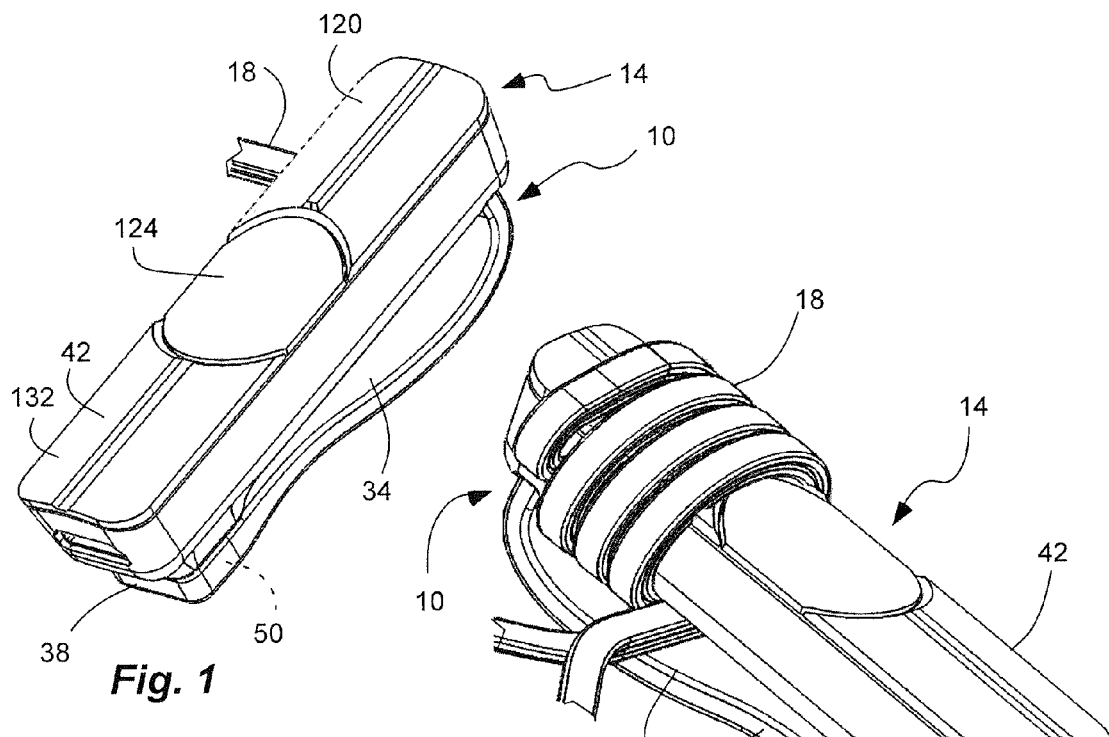
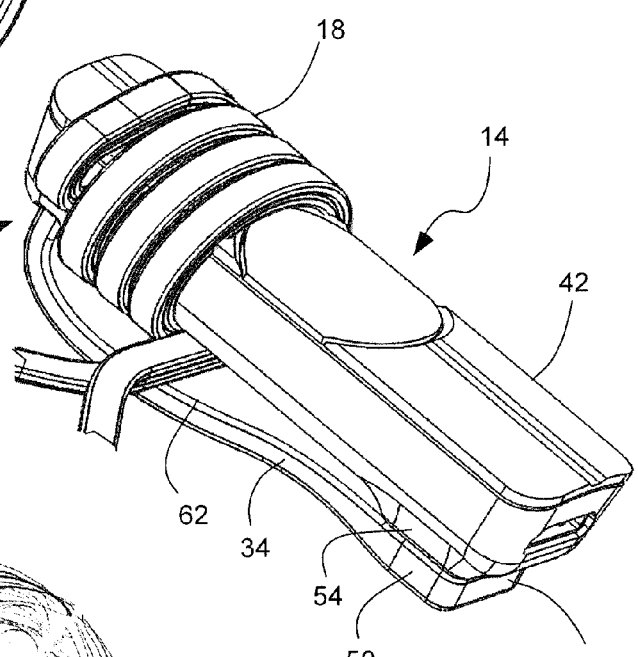
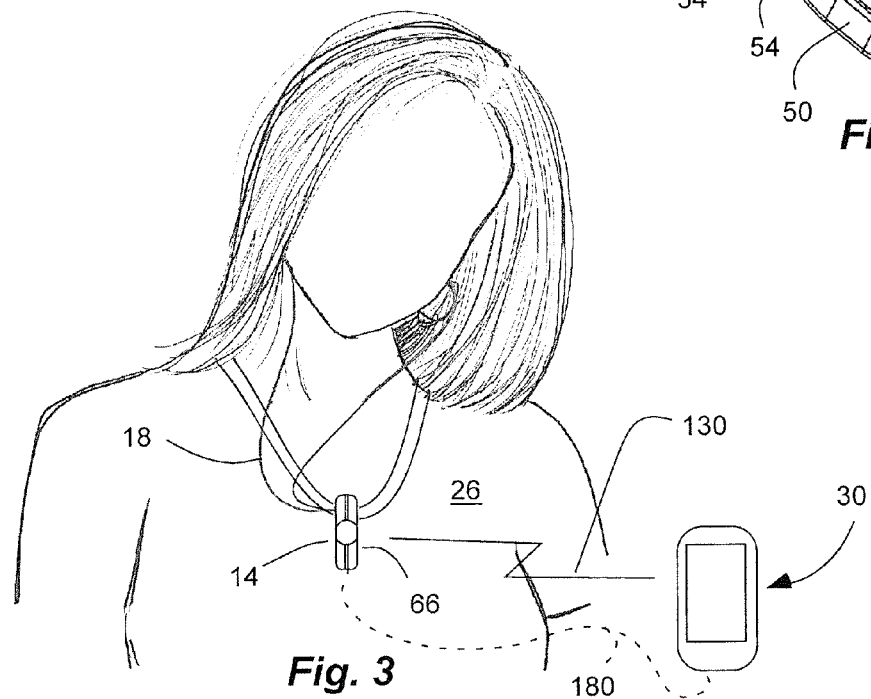
Fig. 1
Fig. 2
Fig. 3

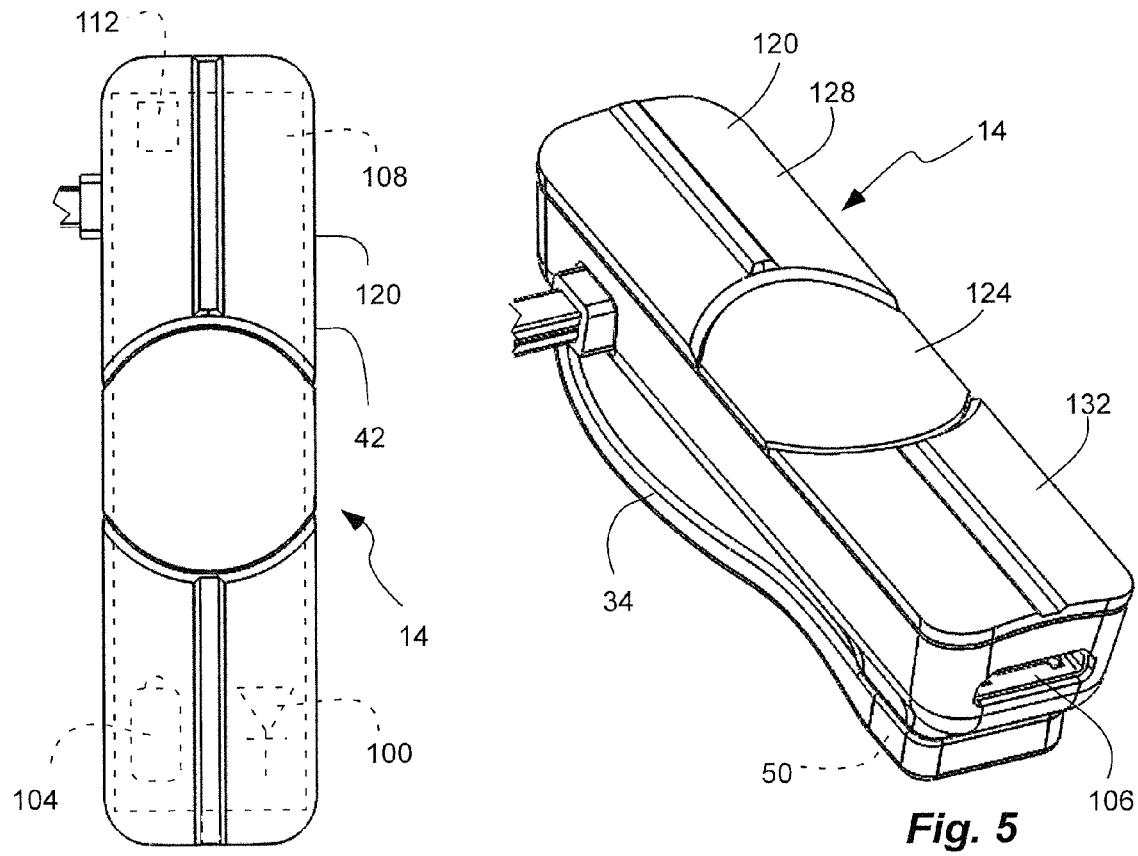
Fig. 4
Fig. 5
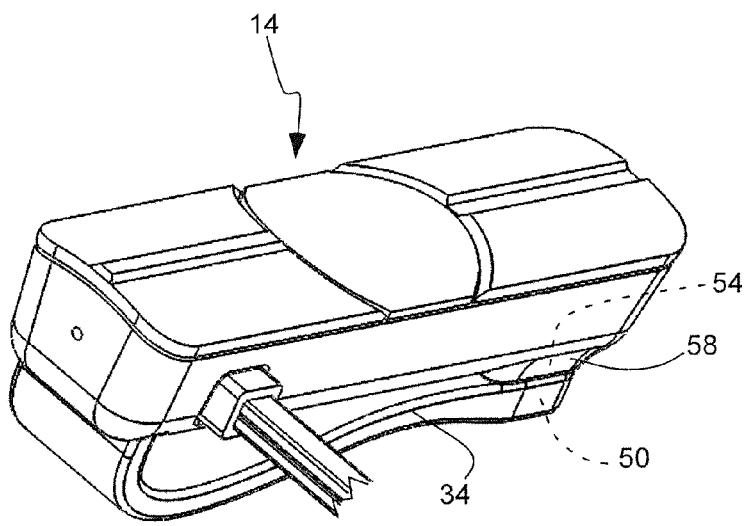
Fig. 6

CORD MANAGEMENT AND CLIP SYSTEM FOR WIRELESS AUDIO RECEIVER

PRIORITY CLAIM

This is a continuation-in-part of copending U.S. patent application Ser. No. 14/812,761, filed Jul. 29, 2015; which claims priority to U.S. Provisional Patent Application Ser. No. 62/031,464, filed Jul. 31, 2014; which are hereby incorporated herein by reference in their entirety.

BACKGROUND

1. Field of the Invention

The present invention relates generally to a wireless audio receiver.

2. Related Art

Earphones are a common accessory to many portable media players, such as cellular phones, tablets or tablet computers, and digital music players. Such earphones typically have a pair of cords or wires running from a headphone plug that plugs into a headphone jack, to a pair of earphones inserted in the ears of a user, or disposed on the ears of a user. The pair or cords or wires is commonly conjoined for a majority of the length, and splits at a junction into separate cords or wires for each of the earphones. Such wires are often capable of becoming tangled and knotted. Similarly, other types of cords can similarly become tangled and knotted.

Wireless (e.g. Bluetooth) receivers typically have a pair of cords or wires running from a headphone plug that plugs into a headphone jack, to a pair of earphones inserted in the ears of a user. Such wireless receivers typically have a mechanical clip to support the wireless receiver. Some wireless receivers are supported by the cord or wires of the earphones themselves, and thus the ears of the user.

SUMMARY OF THE INVENTION

It has been recognized that it would be advantageous to develop a system and method to manage cords or wires of a wireless audio receiver. In addition, it has been recognized that it would be advantageous to develop a system and method to manage cords or wires associated with earphones and the like. Furthermore, it has been recognized that it would be advantageous to develop a system and wireless audio receiver to better support it's weight.

The invention provides a wireless audio receiver comprising a housing, a wireless transceiver disposed in the housing, a battery disposed in the housing and coupled to the wireless transceiver, a control interface carried by the housing, and an audio cord comprising an audio wire with a pair of earbuds at one end and an audio connection at an opposite end coupled to the housing. A flexible band extends from a proximal end coupled to the housing at an attachment point to a distal free end. A free ferromagnetic button is carried by the distal free end of the flexible band. A fixed ferromagnetic button is carried by the housing and is spaced-apart from the attachment point of the flexible band. A ring is formed by the flexible band along with a portion of the housing of the wireless audio receiver, with the free ferromagnetic button of the distal free end of the flexible band magnetically coupled to the fixed ferromagnetic button of the housing, for enclosing and securing a portion of the audio cord wound around the housing of the wireless audio receiver and secured by the flexible band. A clip is formed by the flexible band along with the housing of the wireless audio receiver, with the free ferromagnetic button of the distal free end of the flexible band magnetically coupled to the fixed ferromagnetic button of the housing, with an article of clothing therebetween. The flexible band and the audio cord have a plurality of configurations, including: a used configuration, a wound storage configuration and a clip configuration. In the use configuration, the audio cord extends a longer length, and the ring is free of the audio cord or the ring has a lesser number of passes of the audio cord extending through the ring. In the wound storage configuration, the audio cord extends a shorter length than the longer length, and is wound around the housing of the wireless audio receiver and through the ring, and secured by the flexible band. In the clip configuration, the free ferromagnetic button of the distal free end of the band is magnetically coupled to the fixed ferromagnetic button of the housing of the wireless audio receiver with the article of clothing therebetween.

In addition, the invention provides a cord management and clip system in combination with an audio cord and a wireless audio receiver. The audio cord comprises an audio wire with a pair of earbuds at one end and an audio connection at an opposite end. The opposite end of the audio cord is coupled to the wireless audio receiver. The wireless audio receiver comprises a housing, a wireless transceiver, a battery and a control interface. The cord management and clip system comprises a flexible band extending from a proximal end coupled to the housing of the receiver at an attachment point to a distal free end. A free ferromagnetic button is carried by the distal free end of the flexible band. A fixed ferromagnetic button is carried by the housing of the wireless audio receiver and is spaced-apart from the attachment point of the flexible band. A selectively openable and closable ring is formed by the flexible band along with a portion of the housing of the wireless audio receiver, with the free ferromagnetic button of the distal free end of the flexible band magnetically coupled to the fixed ferromagnetic button of the housing, for enclosing and securing a portion of the audio cord wound around the housing of the wireless audio receiver, and secured by the flexible band. A clip is formed by the flexible band along with the housing of the wireless audio receiver, with the free ferromagnetic button of the distal free end of the flexible band magnetically coupled to the fixed ferromagnetic button of the housing, with an article of clothing therebetween. The system and the audio cord have a plurality of configurations, including: a use configuration, a wound storage configuration, and a clip configuration. In the use configuration, the audio cord extends a longer length, and the ring is free of the audio cord, or the ring has a lesser number of passes of the audio cord extending through the ring. In the wound storage configuration, the audio cord extends a shorter length than the longer length, and is wound around the housing of the wireless audio receiver and through the ring, and secured by the flexible band. In the clip configuration, the free ferromagnetic button of the distal free end of the band is magnetically coupled to the fixed ferromagnetic button of the housing of the wireless audio receiver, with the article of clothing therebetween.

Furthermore, the invention provides a wireless audio receiver comprising a housing with a wireless transceiver and a battery disposed therein. An audio cord comprises an audio wire with a pair of earbuds at one end and an audio connection at an opposite end coupled to the housing. A flexible band is coupled to the housing at a proximal end and extends to a distal free end. A magnetic coupling is between the distal free end of the flexible band and the housing. The flexible band and the housing form a ring for enclosing and securing a portion of the audio cord wound around the housing of the wireless audio receiver and secured by the flexible band. The flexible band and the housing form a clip capable of gripping an article of clothing in the magnetic coupling.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a perspective view of a cord management and clip system and a wireless audio receiver in combination with a cord (such as an audio cord comprising an audio wire extending from the wireless audio receiver to a pair of earbuds) in accordance with an embodiment of the present invention, shown in a use or listening configuration, and with a flexible band shown in a closed configuration;

FIG. 2 is a perspective view of the cord management and clip system and a wireless audio receiver of FIG. 1, shown in a wound storage configuration with the audio cord wound around the wireless audio receiver and secured with the flexible band;

FIG. 3 is a perspective view of the cord management and clip system and a wireless audio receiver of FIG. 1, shown in the use or listening configuration, and shown carried by an article of clothing, and in a clip configuration with the article of clothing between the flexible band and the wireless audio receiver (or housing thereof);

FIG. 4 is a front view of the cord management and clip system and a wireless audio receiver of FIG. 1, shown schematically with various components of the wireless audio receiver;

FIG. 5 is a perspective view of the cord management and clip system and the wireless audio receiver of FIG. 1;

FIG. 6 is a perspective view of the cord management and clip system and the wireless audio receiver of FIG. 1;

FIG. 14 is a perspective view of a method for wearing the wireless audio receiver with the cord management and clip system;

FIGS. 19 and 20*a-b* are perspective views of a method for managing an audio cord; with FIG. 20*a* showing forming the audio cord into a loop; and FIG. 20*b* showing wrapping a flexible band around a portion of the loop by extending a distal free end through the loop and back towards a proximal end extending from a housing of the wireless audio receiver; and FIG. 19 showing coupling the distal free end to the housing by magnetically coupling a free ferromagnetic button embedded in the distal free end of the band to a fixed ferromagnetic button embedded in the housing forming a ring enclosing and securing the portion of the loop, defining the loop storage configuration;

FIGS. 18, 20*a* and 21 are perspective views of a method for managing an audio cord; with FIG. 20*a* showing forming the audio cord into a bundle; FIG. 21 showing wrapping a flexible band around a portion of the bundle by extending a distal free end around the bundle and back towards a proximal end extending from a housing; and FIG. 18 showing coupling the distal free end to the housing by magnetically coupling a free ferromagnetic button embedded in the distal free end of the band to a fixed ferromagnetic button embedded in the housing forming a ring enclosing and securing the portion of the bundle, defining the bundle storage configuration;

Figure 7:
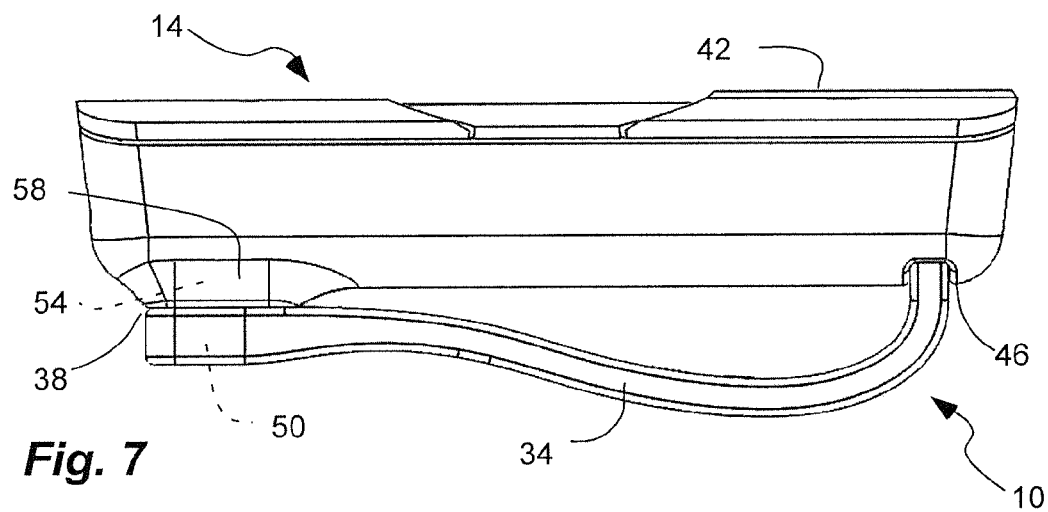
FIG. 7 is a side view of the cord management and clip system and the wireless audio receiver of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic button is a magnet or is magnetic, such as a permanent magnet, or is attracted to magnets, such as by containing iron.

The term "portable, hand-held computer" is used broadly herein to refer to a computer or multi-media device that is one-piece and that is portable and handheld, such as cellular or cell phones, smart phones, tablets or tablet computers, so called phablets, digital music players (MP3 players), etc. The portable, hand-held computer can have a battery and memory and a processor with software running thereon. The portable, hand-held computer can have WiFi and Bluetooth connectivity, and can have a wireless transmitter, receiver, or transceiver. In addition, the portable, hand-held computer can include a digital camera. The term "cellular phone" is used broadly herein to refer to any communication device with wireless communication capability. Thus, the cellular phone or communication device can connect and communicate over a cellular network. In addition, the cellular phone or communication device can wirelessly couple to a wireless area network, which in turn can couple to a telephone network or line.

The term "computer" is used herein to refer to a portable, hand-held computer, as described above, as well as other computing devices or platforms, such as desk-top or lap-top computers, etc.

The term "transceiver" is used herein to refer to a transmitter for transmitting a signal, a receiver for receiving a signal, or both a transmitter and a receiver. The transceiver can both send and receive, or can include a transmitter for transmitting a signal, and a receiver for receiving a signal.

The term "article of clothing" is used broadly herein to refer to an item worn by the user, including by way of example, a shirt, a blouse, a jacket or sweater, a scarf, a strap of a purse or backpack, a lanyard, etc. In one aspect, the article of clothing can have an edge, such as a collar, to which the clip can attach. In another aspect, the article of clothing can have a fold forming an edge to which the clip can attach.

Description

As illustrated in FIGS. 1-17, a cord management and clip system 10, and a wireless audio receiver 14 with such a cord management and clip system 10, and methods for managing an audio cord 18 with earbuds 22, and clipping or wearing the wireless audio receiver 14 on an article of clothing 26, in example implementations in accordance with the invention are shown. The wireless audio receiver 14 can wirelessly pair (such as with Bluetooth) with a portable, hand-held computer 30, namely a cell phone, to receive streaming audio data, such as music and communication data. The cord management and clip system 10 has a flexible band 34 and a ferromagnetic coupling 38 to clip the wireless audio receiver 14 to the article of clothing 26 so that the wireless audio receiver can be worn and easily accessed, without hanging from the audio wire, and thus without hanging from the user's ears. In addition, the flexible band 34 and the ferromagnetic coupling 38 of the cord management and clip system 10 allow for easy and secure storage of the audio cord wound around the wireless audio receiver 14, and secured by the flexible band 34 and the ferromagnetic coupling 38.

The wireless audio receiver 14 has a housing or body 42. The housing 42 can be elongated with a length greater than a width and depth, or diameter. The housing can be formed of plastic and can be formed by injection molding. The housing can have a front and a back, and a top and a bottom. The front can be configured to face outwardly with respect to the user, and the top can be configured to face the user's face during use. As described in greater detail below, the housing can contain a wireless transceiver, battery, processor, and microphone, and can carry a control interface, all configured to pair the wireless audio receiver 14 with the portable, hand-held computer 30 (cellular phone), such as by Bluetooth, to receiving streaming audio data, such as music and communication data, and to send control signals.

Figure 8:
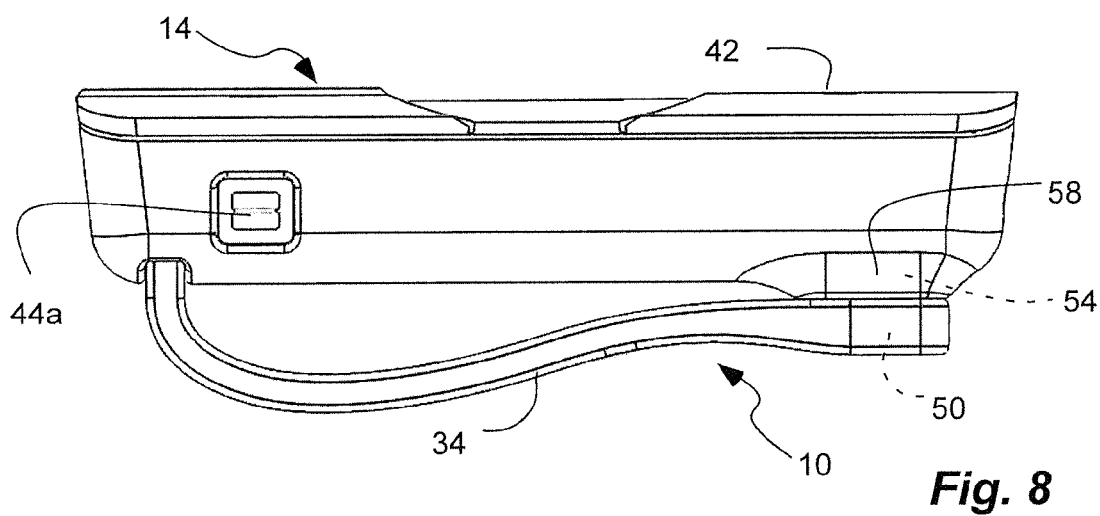
FIG. 8 is a side view of the cord management and clip system and the wireless audio receiver of FIG. 1, showing a flat strain relief for a flat audio cord.
Figure 9:
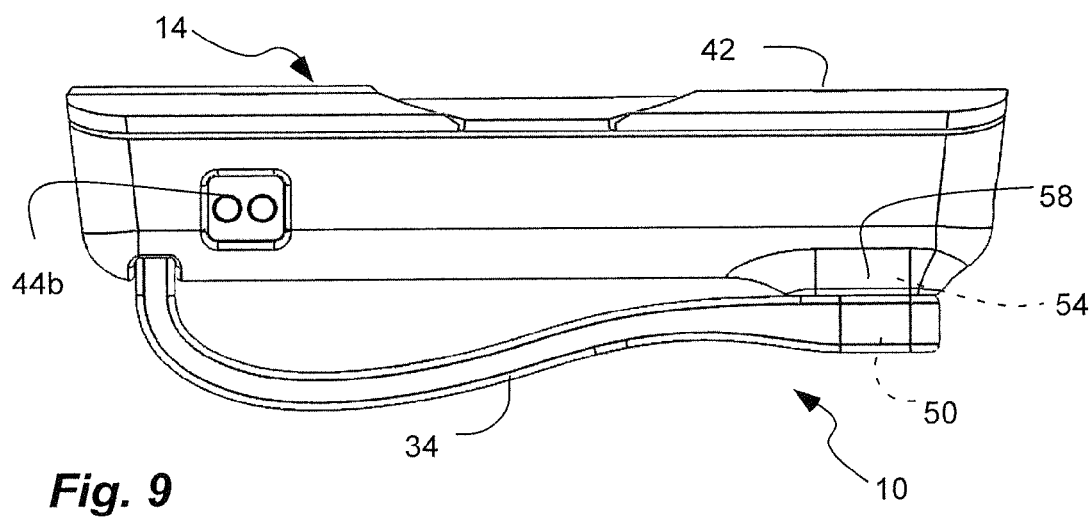
FIG. 9 is a side view of the cord management and clip system and the wireless audio receiver of FIG. 1, showing a round strain relief for a round audio cord.
Figure 10:
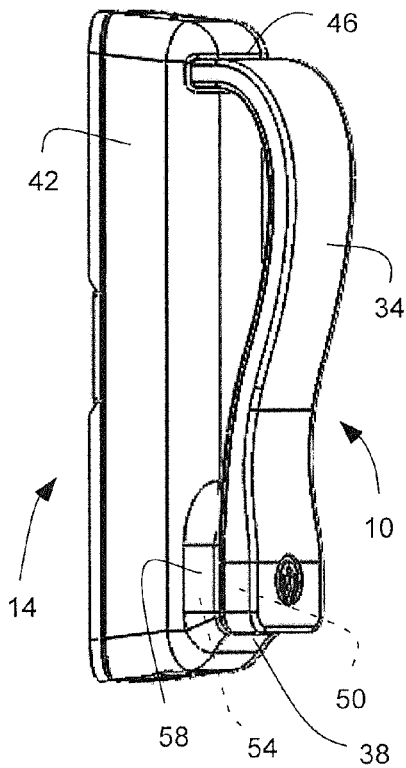
FIG. 10 is a perspective view of the cord management and clip system and the wireless audio receiver of FIG. 1.
Figure 11:
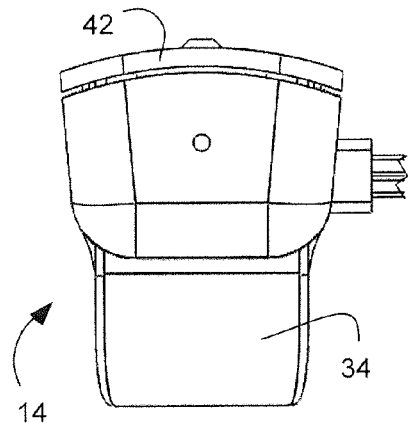
FIG. 11 is a top view of the cord management and clip system and the wireless audio receiver of FIG. 1.
Figure 12:
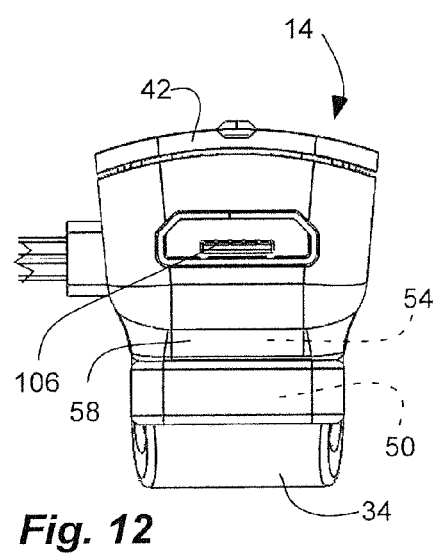
FIG. 12 is a bottom view of the cord management and clip system and the wireless audio receiver of FIG. 1.
Figure 13:
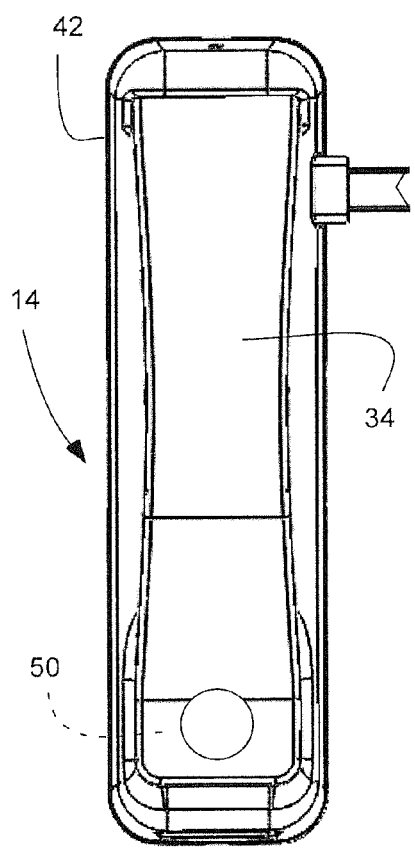
FIG. 13 is a back view of the cord management and clip system and the wireless audio receiver of FIG. 1.

The audio cord 18 can comprise the pair of earbuds 22 at one end and an audio connection (fixed or removable) at an opposite end coupled to the housing 42. The audio cord 18 can have an audio wire with a proximal end coupled to the housing 42 of the wireless audio receiver 14 and distal free end(s) with the earbuds 22. The audio cord 18 can include a pair of audio wires, including one for each earbud 22. The audio cord 18 can include a pair of conjoined wires extending from the proximal end at the housing 42, and separating at a junction into a pair of separate audio wires terminating at the earbuds 22. In one aspect, the audio cord 18 or the audio wire can be flat (wider than depth) to resist tangling. In one aspect, the proximal end of the audio cord 18 or the audio wire can be fixed (inseperable) to the housing 42 of the wireless audio receiver 14 using a strain relief 44a or 44b (FIGS. 8 and 9) coupled to the proximal end of the audio cord. The audio cord 18 can include or the strain relief 44a and 44b can be an enlargement on the proximal end of the audio cord and disposed inside the housing 42, and having a size greater than an opening in the housing through which the audio cord passed, to fix the audio cord to the housing. In one aspect, the strain relief 44a can be flat (with flat holes) to accommodate a flat audio cord 18, as shown in FIG. 8. In another aspect, the strain relief 44b can be round (with round holes) to accommodate a round audio cord, as shown in FIG. 9. The strain relief 44a or 44b on the audio cord 18 allow the housing to be configured the same whether a flat audio cord or a round audio cord is utilized. In another aspect, the proximal end of the audio cord or the audio wire can include an audio plug (e.g. a 3.5 mm plug) removably inserted into an audio port (e.g. a 3.5 mm socket) in the housing. The earbuds can be sized and shaped to be received in and carried by the user's ears. In another aspect, the audio cord can be similar to that described above, but with the audio cord extending as a single wire, or pair of conjoined wires, to a first earbud, and a wire extending from the first earbud to a second earbud. Thus, the conjoined wires can split at the first earbud. The cord management and clip system 10 can be used to manage and secure the audio cord 18 using the flexible band 34, as described in greater detail below.

The flexible band 34 extends from a proximal end coupled to the housing 42 at an attachment point to a distal free end. The flexible band 34 can be coupled to the rear of the housing, opposite the control interface. The flexible band 34 can extend from an aperture 46 (FIG. 10) in the rear of the housing 42. The proximal end of the flexible band 34 can be disposed in the housing 42. The proximal end of the flexible band 34 can extend from inside the housing 42, and out of the aperture 46 in the housing. In one aspect, the proximal end of the flexible band 34 can have one or more bores receiving posts inside the housing to secure the proximal end of the flexible band to the housing. In another aspect, the proximal end of the flexible band can have an enlargement disposed in the housing and sized larger than the aperture. In one aspect, the proximal end of the flexible band 34 can extend substantially perpendicular from the housing 42. The band 34 can be flexible and bendable. The band 34 can be flexible to form a ring 62 and a clip 66 along with the housing 42 in a closed configuration. The band 34 can be flexible so that the distal free end can bend outwardly away from the housing 42 to form an opening to the ring and the clip, and defining an open configuration.

In one aspect, the flexible band 34 can be a solid band, and can be formed of a polymer material. In one aspect, the band can be formed of silicone. The flexible band can be flexible and resilient. In addition, the flexible band can be elastic. The proximal end and/or the free distal end of the flexible band 34 can be enlarged with respect to an intermediate portion of the flexible band. The reduced size or cross-section of the intermediate portion can facilitate elastic stretching of the band, while the enlarged size or cross-section of the ends can facilitate securement to the housing and can accommodate ferromagnetic elements, as described below. In addition, the enlarged distal free end can facilitate grasping and manipulation by the user.

The magnetic coupling 38 can comprise ferromagnetic elements or buttons in the housing 42 and in the distal free end of the flexible band 34. The ferromagnetic elements or buttons can magnetically attract and couple with one another. A free ferromagnetic button 50 is carried by and/or embedded in the distal free end of the flexible band 34. The distal free end of the flexible band 34 can be enlarged (with respect to an intermediate portion of the band) to accommodate the button. A fixed ferromagnetic button 54 is carried by and/or embedded in the housing 42. The fixed ferromagnetic button 54 is spaced-apart from the attachment point (and aperture 46) of the flexible band 34. The housing 42 can include a protrusion 58 extending from the rear of the housing, and the fixed ferromagnetic button 54 can be carried by and/or disposed in the protrusion 58 of the housing. The protrusion 58 can space the button 54, and thus the band 34, spaced-apart from the housing 42, and defining a gap or slot (along with the perpendicular orientation of the proximal end of the band 34 with respect to the housing) between the band 34 and the housing 42 to accommodate the audio cord 18 and article of clothing 26, as described in greater detail below.

In one aspect, the free ferromagnetic button 50 can be embedded in the distal free end of the band 34; while the fixed ferromagnetic button 54 can be embedded in the housing 42, or protrusion 58 thereof. In one aspect, the buttons can be completely embedded within the material of the housing or the band. The band and/or the housing can include indicia to indicate the location of the buttons, and thus a coupling location. In another aspect, the buttons can be partially embedded, and can have a portion thereof exposed through the band and/or the housing. The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic button is a magnet or is magnetic, such as a permanent magnet, or is attracted to magnets, such as by containing iron. In one aspect, both of the buttons can be magnets (and thus both buttons are ferromagnetic). In another aspect, one of the buttons can be a magnet, while the other button contains iron (and thus both buttons are ferromagnetic).

In one aspect, the distal free end of the band 34 can have a flat surface, and the housing 42 or protrusion 58 can have a flat surface to which the flat surface of the distal free end of the band abuts in the closed configuration forming the loop. The flat surfaces can maximize the magnetic grip between the ferromagnetic buttons.

In one aspect, the attachment point of the proximal end of the flexible band 34 is located at one end of the housing 42 (such as the top), and the fixed ferromagnetic button 58 is located at an opposite end of the housing (such as the bottom). Thus, the flexible band 34 can extend substantially a length of the housing 42 (from the top to the bottom in the closed configuration), and the length of the band 34 can be maximized with respect to the housing. In one aspect, the flexible band 34 can be longer than a distance from the attachment point to the fixed ferromagnetic button of the housing. In addition, the proximal end of the flexible band 34 can extend substantially perpendicular from the housing 42. Thus, the flexible band 34 can bow (or form a bow) in a convex arcuate shape when the free ferromagnetic button 50 of the distal free end of the flexible band is magnetically coupled to the fixed ferromagnetic button 54 of the housing in the closed configuration (as shown in FIGS. 1, 2, 7 and 10). The bow can also form the gap or slot between the band 34 and the housing 42 to accommodate the audio cord 18 and article of clothing 26.

The flexible band 34 along with a portion of the housing 42 of the wireless audio receiver 14 form a ring 62 (FIG. 16) in the closed configuration with the free ferromagnetic button 50 of the distal free end of the flexible band 34 magnetically coupled to the fixed ferromagnetic button 54 of the housing 42. The ring 62 can be selectively openable and closable by separating and coupling the ferromagnetic buttons 50 and 54, or magnetic coupling, respectively. The ring 62 can enclose and secure a portion of the audio cord 18 wound around the housing 42 of the wireless audio receiver 14, and the audio cord 18 can be secured to the housing 42 by the flexible band 34. The flexible band 34 along with a portion of the housing 42 of the wireless audio receiver form a clip 66 (FIG. 14) in the clip configuration with the free ferromagnetic button 50 of the distal free end of the flexible band 34 magnetically coupled to the fixed ferromagnetic button 54 of the housing 42 with the article of clothing 26 therebetween to secure the wireless audio receiver 14 to the article of clothing 26.

Figure 14:
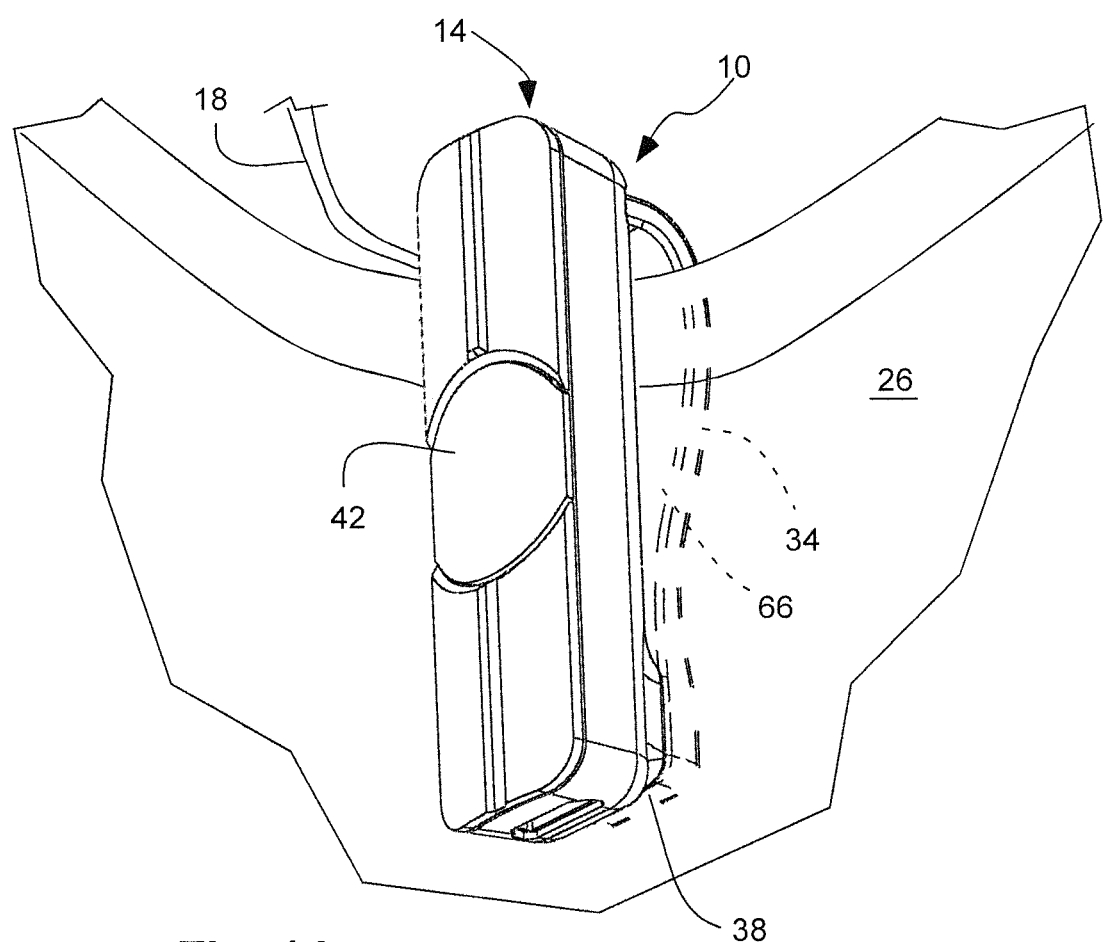
FIG. 14 is a detailed perspective view of the cord management and clip system and the wireless audio receiver of FIG. 1, shown in the use or listening configuration, and shown carried by the article of clothing, and in the clip configuration with the article of clothing between the flexible band and the wireless audio receiver (or housing thereof); in addition.
Figure 15:
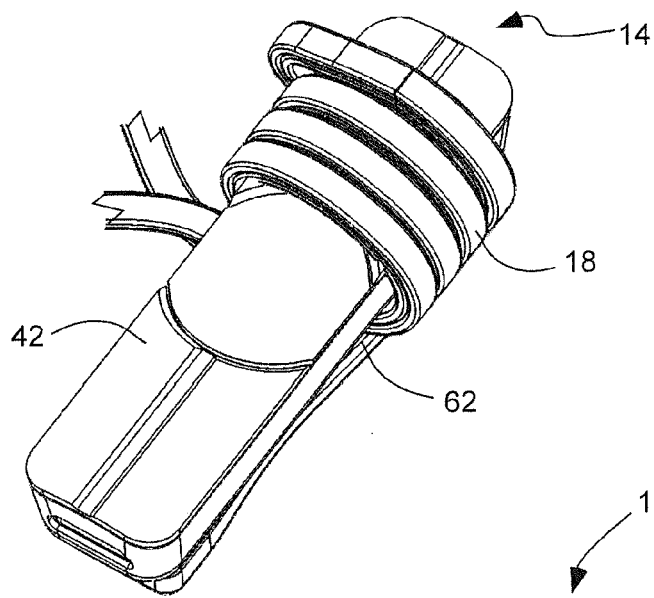
FIG. 15 is a perspective view of the cord management and clip system and the wireless audio receiver of FIG. 1, shown in the wound storage configuration with the audio cord wound around the wireless audio receiver and secured with the flexible band.
Figure 16:
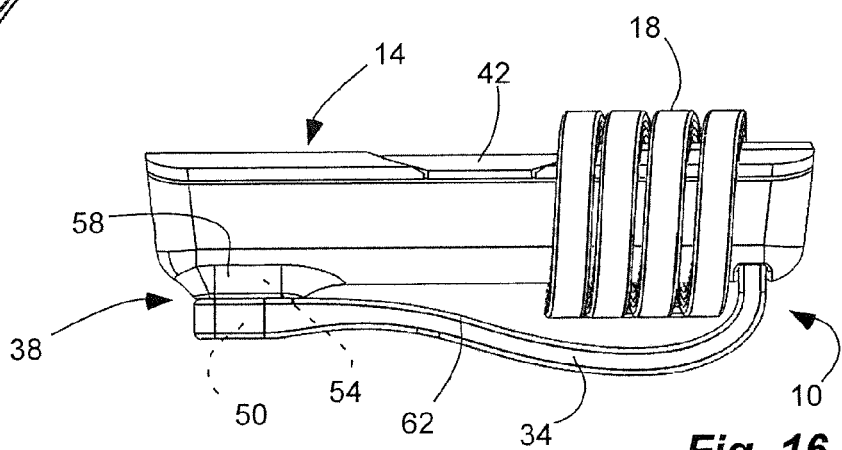
FIG. 16 is a side view of the cord management and clip system and the wireless audio receiver of FIG. 1, shown in the wound storage configuration with the audio cord wound around the wireless audio receiver and secured with the flexible band.
Figure 17:
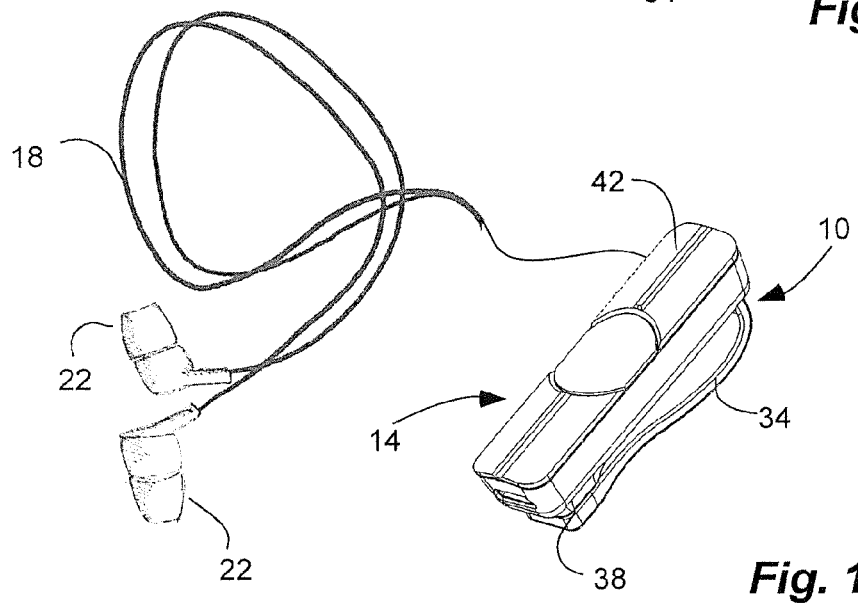
FIG. 17 is a perspective view of the cord management and clip system and the wireless audio receiver of FIG. 1, shown in a use configuration with the audio cord extending a longer length, and with a ring formed by the flexible band in the closed configuration free of the audio cord or with the ring having a lesser number of passes of the audio cord extending through the ring.

The flexible band 34, and the audio cord 18, and the system 10, can have a plurality of configurations, including: a use configuration, as shown in FIGS. 1 and 17 (and FIGS. 3 and 14); a wound storage configuration, as shown in FIGS. 2, 15 and 16; and a clip configuration, also shown in FIGS. 3 and 14. In the use configuration (FIGS. 1, 3, 14 and 17), the audio cord 18 extends a longer length (from the housing and with respect to the wound storage configuration). In addition, the ring 62 is free of the audio cord 18, or the ring 62 has a lesser number of passes of the audio cord 18 extending through the ring (with respect to the wound configuration). In the wound storage configuration (FIGS. 2, 15 and 16), the audio cord 18 extends a shorter length than the longer length (from the housing). In addition, the audio cord 18 is wound around the housing 42 of the wireless audio receiver 14, and through the ring 62, and the audio cord 18 is secured to the housing (or held to the housing) by the flexible band 34. In the clip configuration (FIGS. 3 and 14), the free ferromagnetic button 50 of the distal free end of the flexible band 34 is magnetically coupled to the fixed ferromagnetic button 54 of the housing 42 of the wireless audio receiver 14 with the article of clothing 26 between the free and fixed ferromagnetic buttons 50 and 54. The use and clip configurations can be the same; i.e. in the use configuration the system 10 and/or the wireless audio receiver 14 can be clipped to the article of clothing 26; and in the clip configuration the audio cord 18 can extend a longer length and the ring 62 can be free of the audio cord.

A method for wearing or clipping the wireless audio receiver 14 with the cord management and clip system 10 comprises: 1) opening the clip 66 by separating the free ferromagnetic button 50 of the distal free end of the flexible band 34 from the fixed ferromagnetic button 54 of the housing 42 of the wireless audio receiver 14; 2) positioning the clip 66 on the article of clothing 26 by disposing the article of clothing 26 between the flexible band 34 and the housing 42; and 3) securing the clip 66 on the article of clothing 26 by magnetically coupling the free ferromagnetic button 50 of the distal free end of the flexible band 34 to the fixed ferromagnetic button 54 of the housing 42 of the wireless audio receiver 14 with the article of clothing 26 between the free and fixed ferromagnetic buttons 50 and 54.

A method for managing the audio cord 18 with the cord management and clip system 10 comprises: 1) opening the ring 62 by separating the free ferromagnetic button 50 of the distal free end of the flexible band 34 from the fixed ferromagnetic button 54 of the housing 42 of the wireless audio receiver; 2) winding the audio cord 18 around the housing 42 of the wireless audio receiver; and 3) closing the ring 62 by magnetically coupling the free ferromagnetic button 50 of the distal free end of the flexible band 34 to the fixed ferromagnetic button 54 of the housing 42, and securing the audio cord 18 to the wireless audio receiver 14 with the flexible band 34.

Figure 18:
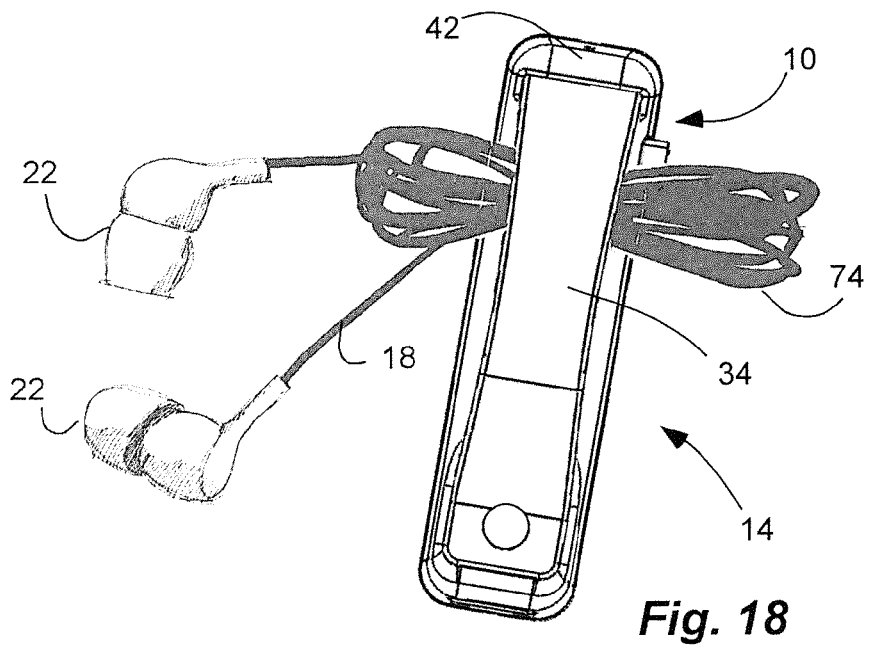
FIG. 18 is a perspective view of the cord management and clip system and the wireless audio receiver of FIG. 1, shown in a bundle storage configuration with the audio cord extending a shorter length than the longer length and wrapped into a bundle with a greater number of passes of the audio cord extending through the ring than the lesser number of passes, and with the audio cord extending back and forth through the ring.
Figure 19:
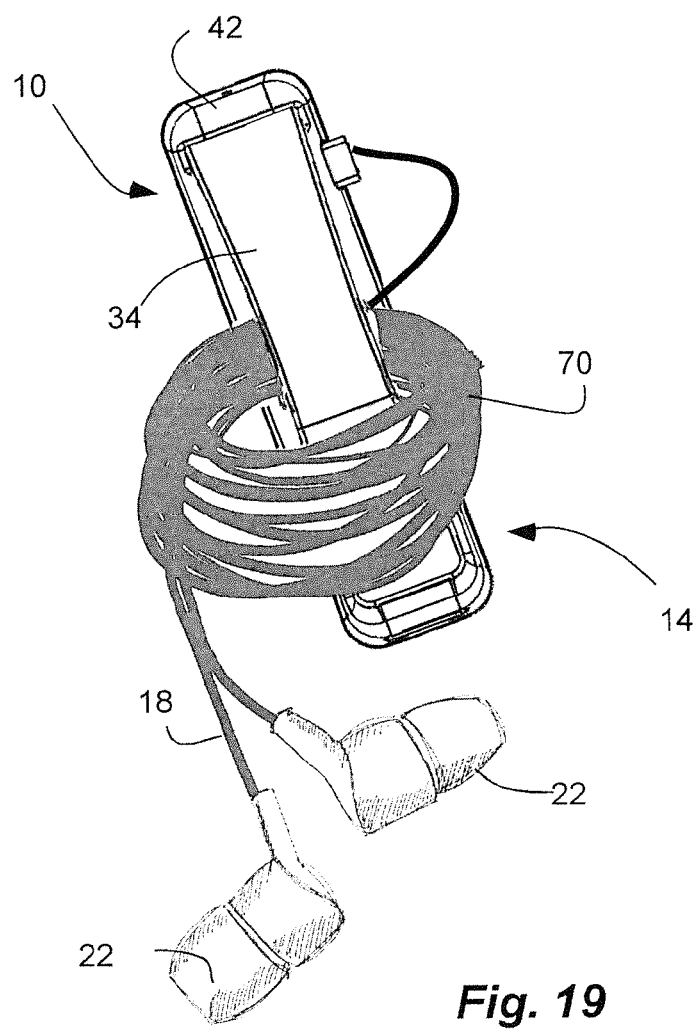
FIG. 19 is a perspective view of the cord management and clip system and the wireless audio receiver of FIG. 1, shown in a loop storage configuration with the audio cord extending a shorter length than the longer length and wrapped into a loop with a greater number of passes of the audio cord extending though the ring than the lesser number of passes, and with the audio cord looping through and around the ring.

In another aspect, the plurality of configurations of the system and the audio cord can further comprise: 1) a loop storage configuration, as shown in FIG. 19; and 2) a bundle storage configuration, as shown in FIG. 18. In the loop storage configuration (FIG. 19), the audio cord 18 can extend a shorter length than the longer length, and can wrapped into a loop 70 with a greater number of passes of the audio cord extending though the ring 62 than the lesser number of passes, and with the audio cord looping through and around the ring 62, and around the band 34. In the bundle storage configuration (FIG. 18), the audio cord 18 can extending a shorter length than the longer length, and can be wrapped into a bundle 74 with a greater number of passes of the audio cord extending through the ring 62 than the lesser number of passes, and with the audio cord extending back and forth through the ring 62.

Figure 20A:
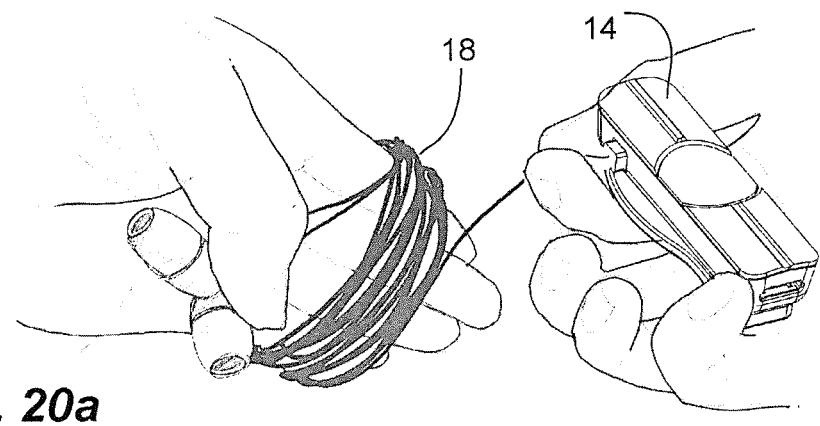
Figure 20B:
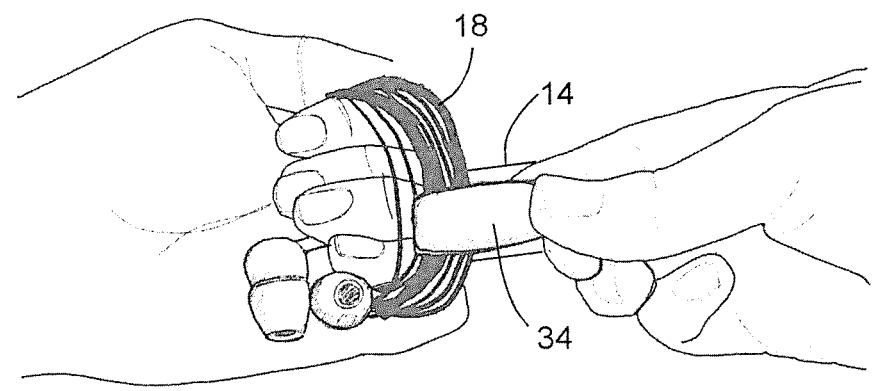
Figure 21:
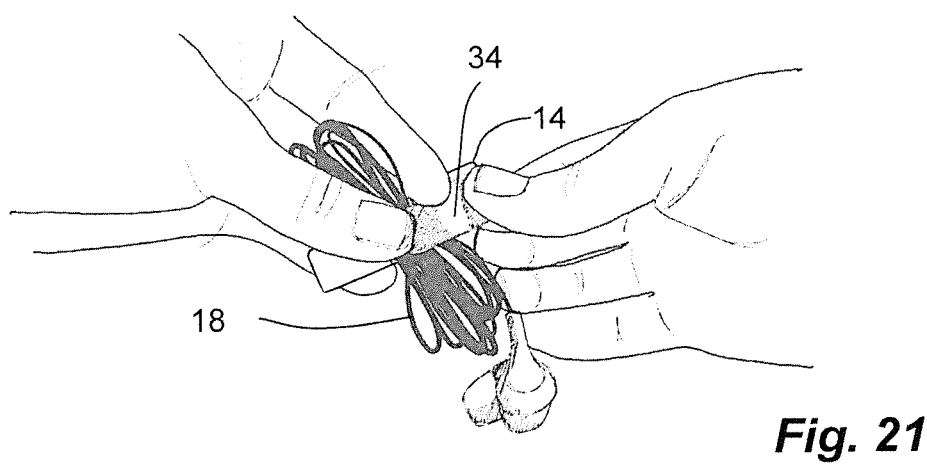

In another aspect, a method for managing the audio cord can comprise:
1) forming the audio cord 18 into a loop 70 (as shown in FIG. 20a, such as by looping the audio cord around the fingers) or a bundle 74 (as shown in FIG. 21, again such as by looping the audio cord around the fingers or wrapping the cord back and forth over itself);
2) wrapping the flexible band 34 around a portion of the loop 70 or the bundle 74 by extending a distal free end through (FIG. 20b) or around (FIG. 21) the loop or bundle and back towards the fixed ferromagnetic button enclosing a portion of the audio cord 18; and
3) magnetically coupling the free ferromagnetic button 50 of the distal free end of the band 34 to the fixed ferromagnetic button 54 of the housing 42 forming the ring 62 enclosing and securing the portion of the loop 70 or bundle 74 (forming the loop storage configuration as shown in FIG. 19, or the bundle storage configuration as shown in FIG. 18).

In addition, the method can further include:
4) uncoupling the free ferromagnetic button 50 of the distal free end of the band 34 from the fixed ferromagnetic button 54 of the housing 42, and removing the audio cord 18 from the ring 62 or band 34 (to form the use configuration as shown in FIG. 17); and
5) clipping the clip 66 (or the wireless audio receiver 14 with the cord management and clip system 10) to the article of clothing 26 by disposing the article of clothing 26 between the free ferromagnetic button 50 of the distal free end of the band 34 and the fixed ferromagnetic button 54 of the housing 42, magnetically coupling the free and fixed ferromagnetic buttons 50 and 54 through the article of clothing 26 (forming the clip configuration as shown in FIGS. 3 and 14).

Figure 22:
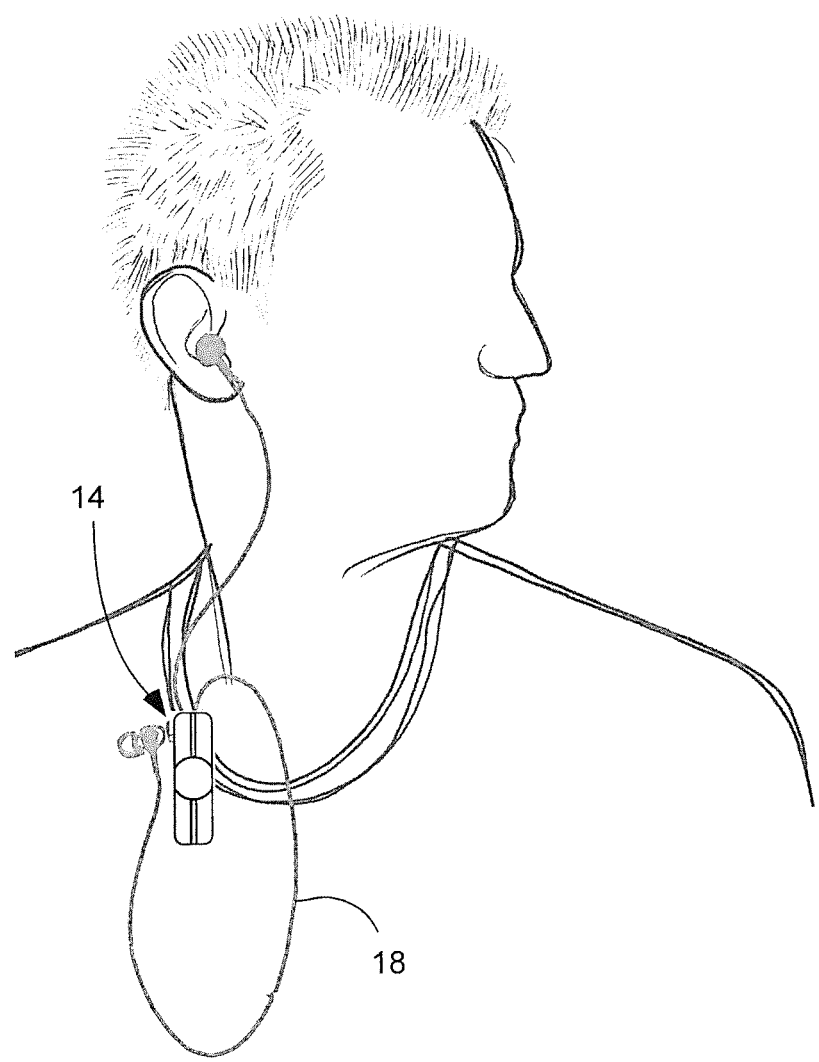
FIG. 22 is a perspective views of the cord management and clip system and the wireless audio receiver of FIG. 1, shown in the use or listening configuration, and shown carried by an article of clothing, and in a clip configuration with the article of clothing between the flexible band and the wireless audio receiver (or housing thereof), and further showing securing an earbud of the pair of earbuds to the housing and/or flexible band by magnetically coupling a ferromagnetic element of the earbud to the fixed ferromagnetic button of the housing or free ferromagnetic button of the flexible band.

In another aspect, the method can further comprise securing an earbud 22 of the pair of earbuds to the housing 42 and/or the flexible band 34, by magnetically coupling a ferromagnetic element of the earbud to the fixed ferromagnetic button 54 of the housing 42, or the free ferromagnetic button 54 of the band 34 (forming the single earbud configuration as shown in FIG. 22).

In addition, the method can include coupling the pair of earbuds 22 together by magnetically coupling the ferromagnetic element of one earbud of the pair of earbuds to a ferromagnetic element of another earbud of the pair of earbuds, and/or the free or fixed ferromagnetic buttons 50 and 54.

Referring to FIG. 4, the wireless audio receiver 14 can comprise a wireless transceiver 100 disposed in and/or carried by the housing 42. A battery 104 can be disposed in and/or carried by the housing 42, and coupled to the wireless transceiver. In one aspect, the battery can be a rechargeable battery coupled to a charging port 106 (such as a mini or micro USB port, or USB type-C port, etc.). A processor 108 can be disposed in and/or carried by the housing 42, and coupled to the wireless transceiver 100 and the battery 104. In addition, a microphone 112 can be disposed in and/or carried by the housing 42, and coupled to the processor 108 and the transceiver 100. (The housing 42 can have a hole in the top end to accommodate the microphone.) In one aspect, the processor 108 can carry the transceiver, the microphone, an amplifier, and a digital memory device. A control interface 120 (such as one or more buttons) can be carried by the housing 42, and electrically coupled to the processor. As described above, the wireless audio receiver 14 can be operable to receive audio data (indicated by 130 in FIG. 3) from the portable, hand-held computer 30, and transmit commands (also indicated by 130 in FIG. 3) to the portable, hand-held computer 30. The audio data can include both music and communication data. The processor 108 and the transceiver 100 can be configured to pair with the portable, hand-held computer 30. The processor 108 can be configured to:
  establish a wireless connection between the wireless transceiver and the portable, hand-held computer;
  receive audio data from the portable, hand-held computer with the wireless transceiver;
  play the audio data through the pair of earbuds;
  transmit a control signal to the portable, hand-held computer with the wireless transceiver to control transmission of audio data from the portable, hand-held computer, including advancing to a next audio data or advancing through the audio data; and
  transmit a control signal to the portable, hand-held computer with the wireless transceiver to toggle the portable, hand-held computer to toggle between transmitting different audio data, including music and communication.

The control interfaced 120 can comprise a plurality of buttons coupled to the processor 108. The plurality of buttons can comprise: 1) a power and play button 124 configured to cause the processor to power on and off; pair with the portable, hand-held computer; play and pause music; and toggle between music and communication; 2) an up button 128 configured to cause the processor to increase volume or advance to the next audio data or both; and a down button 132 configured to cause the processor to decrease volume or revert to a previous audio data or both.

Figure 23:
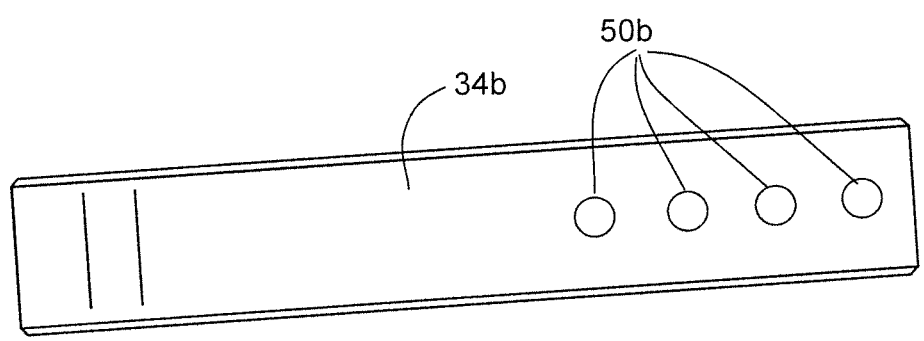
FIG. 23 is a perspective view of another flexible band for the cord management and clip system and the wireless audio receiver of FIG. 1 in accordance with another embodiment of the invention.
Figure 24:
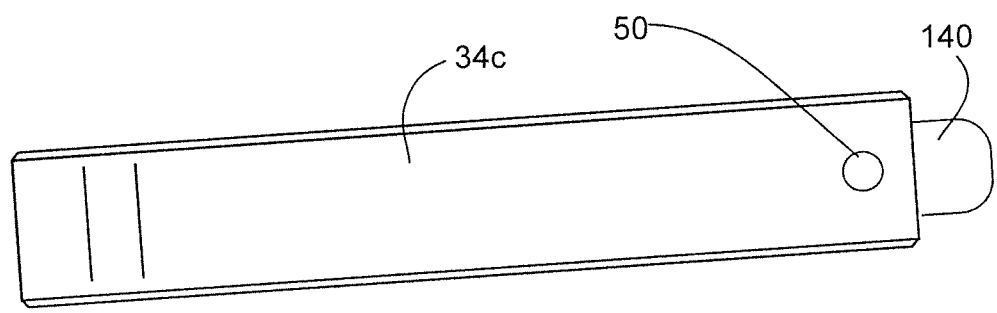
FIG. 24 is a perspective view of another flexible band for the cord management and clip system and the wireless audio receiver of FIG. 1 in accordance with another embodiment of the invention.

Referring to FIG. 23, a plurality of ferromagnetic buttons 50*b* can be arrayed along at least a portion of a length of the flexible band 34*b* to form a plurality of different sized rings. Referring to FIG. 24, a tab or flap 140 can extend beyond the distal free end of the flexible band 34*c* and free of the free ferromagnetic button 50 therein to facilitate grasping and separating the ferromagnetic buttons.

In another aspect, the wireless audio receiver 14 can be configured with a pass-through audio feature or configuration in which an audio wire 180 (FIG. 3) can be coupled between the portable, hand-held computer 30 and the wireless audio receiver 14. Thus, if the battery is discharged, or the power to the wireless audio receiver is turned off, the earbuds 22 can be coupled to the portable, hand-held computer 30 or other audio source, and the audio signal can pass from the portable, hand-held computer 30 or other audio source through the wireless audio receiver 14 to the earbuds 22. The audio wire 180 can have 3.5 mm audio jacks on each end. The housing 42 of the wireless audio receiver 14 can be provided with an audio port, such as a 3.5 mm audio socket. In another aspect, the pass-through audio feature and the charging feature can be combined, such as with a USB type-C port or socket and cable. Thus, the same cable can both charge the battery and provide an audio signal.

In another aspect, the band 34 can be formed of or can comprise a flexible and resilient material, such as a plastic or other elastomer. The material can be elastic. In one aspect, the band can be initially formed in a closed configuration or ring configuration with the distal free end of the band proximal the housing. Thus, the band can form the ring and/or clip and can be biased (or have an initial unstressed at rest configuration) into the closed configuration and into the ring and/or clip by the resiliency of the material. The band can have an open configuration where the distal free end of the band is separated from the housing, and the band is under stress or forms a spring element moved to the open configuration by the application of an applied force. In another aspect, the band can have the opposite configuration, i.e. the band can be initially formed in the open configuration so that the band can be biased (or have an initial unstressed at rest configuration) into the open configuration. The band can have a closed configuration with the band under stress and held by the ferromagnetic buttons in the closed configuration. In another aspect, the band can be initially formed in an open configuration in an arc or straight line so that the band can be biased open, and can be held closed by the magnets. Thus, the band can snap open when the ferromagnetic buttons are released.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A cord management and clip system in combination with an audio cord comprising an audio wire with a pair of earbuds at one end and an audio connection at an opposite end coupled to a wireless audio receiver comprising a housing, a wireless transceiver, a battery and a control interface, the system comprising:
   a) a flexible band extending from a proximal end coupled to the housing of the receiver at an attachment point to a distal free end;
   b) a free ferromagnetic button carried by the distal free end of the flexible band;
   c) a fixed ferromagnetic button carried by the housing of the wireless audio receiver and spaced-apart from the attachment point of the flexible band;
   d) a selectively operable and closable ring formed by the flexible band along with a portion of the housing of the wireless audio receiver with the free ferromagnetic button of the distal free end of the flexible band magnetically coupled to the fixed ferromagnetic button of the housing for enclosing and securing a portion of the audio cord wound around the housing of the wireless audio receiver and secured by the flexible band;
   e) a clip formed by the flexible band along with the housing of the wireless audio receiver with the free ferromagnetic button of the distal free end of the flexible band magnetically coupled to the fixed ferromagnetic button of the housing with an article of clothing therebetween;
   f) the system and the audio cord having a plurality of configurations, including:
      i) a use configuration with the audio cord extending a longer length, and with the ring free of the audio cord or with the ring having a lesser number of passes of the audio cord extending through the ring;
      ii) a wound storage configuration with the audio cord extending a shorter length than the longer length, and wound around the housing of the wireless audio receiver and through the ring and secured by the flexible band; and
      iii) a clip configuration with the free ferromagnetic button of the distal free end of the band magnetically coupling to the fixed ferromagnetic button of the housing of the wireless audio receiver with the article of clothing therebetween.

2. The combination in accordance with claim 1, wherein the wireless audio receiver is operable to receive audio data from a portable, hand-held computer, and transmit commands to the portable, hand-held computer, wherein the wireless audio receiver further comprises:
   a processor coupled to the wireless transceiver and the battery;
   the processor and the transceiver being configured to pair with the portable, hand-held computer, the processor being configured to:
      establish a wireless connection between the wireless transceiver and the portable, hand-held computer;
      receive audio data from the portable, hand-held computer with the wireless transceiver;
      play the audio data through the pair of earbuds;
      transmit a control signal to the portable, hand-held computer with the wireless transceiver to control transmission of audio data from the portable, hand-held computer, including advancing to a next audio data or advancing through the audio data; and
      transmit a control signal to the portable, hand-held computer with the wireless transceiver to toggle the portable, hand-held computer to toggle between transmitting different audio data, including music and communication; and wherein the control input further comprises a plurality of buttons coupled to the processor, the plurality of buttons comprising:
- a power and play button configured to cause the processor to power on and off; pair with the portable, hand-held computer; play and pause music; and toggle between music and communication;
- an up button configured to cause the processor to increase volume or advance to the next audio data or both; and
- a down button configured to cause the processor to decrease volume or revert to a previous audio data or both.

3. A method for wearing the wireless audio receiver with the cord management and clip system in accordance with claim 1, the method comprising:
- a) separating the free ferromagnetic button of the distal free end of the flexible band from the fixed ferromagnetic button of the housing of the wireless audio receiver;
- b) disposing the article of clothing between the flexible band and the housing; and
- c) magnetically coupling the free ferromagnetic button of the distal free end of the flexible band to the fixed ferromagnetic button of the housing of the wireless audio receiver with the article of clothing therebetween.

4. A method for managing the audio cord with the cord management and clip system in accordance with claim 1, the method comprising:
- a) separating the free ferromagnetic button of the distal free end of the flexible band from the fixed ferromagnetic button of the housing of the wireless audio receiver;
- b) winding the audio cord around the housing of the wireless audio receiver;
- c) magnetically coupling the free ferromagnetic button of the distal free end of the flexible band to the fixed ferromagnetic button of the housing and securing the audio cord to the wireless audio receiver.

5. A wireless audio receiver device, comprising:
- a) a housing;
- b) a wireless transceiver disposed in the housing;
- c) a battery disposed in the housing and coupled to the wireless transceiver;
- d) a control interface carried by the housing;
- e) an audio cord comprising an audio wire with a pair of earbuds at one end and an audio connection at an opposite end coupled to the housing;
- f) a flexible band extending from a proximal end coupled to the housing at an attachment point to a distal free end;
- g) a free ferromagnetic button carried by the distal free end of the flexible band;
- h) a fixed ferromagnetic button carried by the housing and spaced-apart from the attachment point of the flexible band;
- i) a ring formed by the flexible band along with a portion of the housing of the wireless audio receiver with the free ferromagnetic button of the distal free end of the flexible band magnetically coupled to the fixed ferromagnetic button of the housing for enclosing and securing a portion of the audio cord wound around the housing of the wireless audio receiver and secured by the flexible band;
- j) a clip formed by the flexible band along with the housing of the wireless audio receiver with the free ferromagnetic button of the distal free end of the flexible band magnetically coupled to the fixed ferromagnetic button of the housing with an article of clothing therebetween;
- k) the flexible band and the audio cord having a plurality of configurations, including:
  - i) a use configuration with the audio cord extending a longer length, and with the ring free of the audio cord or with the ring having a lesser number of passes of the audio cord extending through the ring;
  - ii) a wound storage configuration with the audio cord extending a shorter length than the longer length, and wound around the housing of the wireless audio receiver and through the ring and secured by the flexible band; and
  - iii) a clip configuration with the free ferromagnetic button of the distal free end of the band magnetically coupling to the fixed ferromagnetic button of the housing of the wireless audio receiver with the article of clothing therebetween.

6. The device in accordance with claim 5, wherein the flexible band is longer than a distance from the attachment point to the fixed ferromagnetic button of the housing so that the flexible band bows in a convex arcuate shape when the free ferromagnetic button of the distal free end of the flexible band is magnetically coupled to the fixed ferromagnetic button of the housing.

7. The device in accordance with claim 5, further comprising the proximal end of the flexible band extending substantially perpendicular from the housing.

8. The device in accordance with claim 5, further comprising an aperture in the housing, and the proximal end of the flexible band extending from inside the housing, and out of the aperture in the housing.

9. The device in accordance with claim 5, further comprising a protrusion in the housing and the fixed ferromagnetic button being carried by the protrusion of the housing.

10. The device in accordance with claim 5, wherein the attachment point of the proximal end of the flexible band is located at one end of the housing, and the fixed ferromagnetic button is located at an opposite end of the housing, and the flexible band extends substantially a length of the housing.

11. The device in accordance with claim 5, wherein the proximal end and the free distal end of the flexible band are enlarged with respect to an intermediate portion of the flexible band.

12. The device in accordance with claim 5, wherein the flexible band is a solid polymer band.

13. The device in accordance with claim 5, wherein the plurality of configurations of the system and the audio further comprises:
- i) a loop storage configuration with the audio cord extending a shorter length than the longer length, and wrapped into a loop with a greater number of passes of the audio cord extending though the ring than the lesser number of passes, and with the audio cord looping through and around the ring; and
- ii) a bundle storage configuration with the audio cord extending a shorter length than the longer length, and wrapped into a bundle with a greater number of passes of the audio cord extending through the ring than the lesser number of passes, and with the audio cord extending back and forth through the ring.

14. The device in accordance with claim 5, further comprising:
- a plurality of ferromagnetic buttons arrayed along at least a portion of a length of the flexible band to form a plurality of different sized rings.

15. The device in accordance with claim 5, further comprising:
a tab or flap extending beyond the distal free end of the flexible band and free of the free ferromagnetic button therein.

16. The device in accordance with claim 5, wherein the wireless audio receiver is operable to receive audio data from a portable, hand-held computer, and transmit commands to the portable, hand-held computer, wherein the wireless audio receiver further comprises:
a processor coupled to the wireless transceiver and the battery;
the processor and the transceiver being configured to pair with the portable, hand-held computer, the processor being configured to:
establish a wireless connection between the wireless transceiver and the portable, hand-held computer;
receive audio data from the portable, hand-held computer with the wireless transceiver;
play the audio data through the pair of earbuds;
transmit a control signal to the portable, hand-held computer with the wireless transceiver to control transmission of audio data from the portable, hand-held computer, including advancing to a next audio data or advancing through the audio data; and
transmit a control signal to the portable, hand-held computer with the wireless transceiver to toggle the portable, hand-held computer to toggle between transmitting different audio data, including music and communication; and
wherein the control input further comprises a plurality of buttons coupled to the processor, the plurality of buttons comprising:
a power and play button configured to cause the processor to power on and off; pair with the portable, hand-held computer; play and pause music; and toggle between music and communication;
an up button configured to cause the processor to increase volume or advance to the next audio data or both; and
a down button configured to cause the processor to decrease volume or revert to a previous audio data or both.

17. A wireless audio receiver device, comprising:
a) a housing;
b) a wireless transceiver disposed in the housing;
c) a battery disposed in the housing and coupled to the wireless transceiver;
d) a control interface carried by the housing;
e) a flexible band extending from a proximal end coupled to the housing at an attachment point to a distal free end;
f) a free ferromagnetic button carried by the distal free end of the flexible band;
g) a fixed ferromagnetic button carried by the housing and spaced-apart from the attachment point of the flexible band;
h) a ring formed by the flexible band along with a portion of the housing of the wireless audio receiver with the free ferromagnetic button of the distal free end of the flexible band magnetically coupled to the fixed ferromagnetic button of the housing; and
i) a clip formed by the flexible band along with the housing of the wireless audio receiver with the free ferromagnetic button of the distal free end of the flexible band magnetically coupled to the fixed ferromagnetic button of the housing with an article of clothing therebetween.

18. The device in accordance with claim 17, further comprising:
a) an audio cord comprising an audio wire with a pair of earbuds at one end and an audio connection at an opposite end coupled to the housing;
b) the audio cord having a plurality of configurations, including:
i) a use configuration with the audio cord extending a longer length, and with the ring free of the audio cord or with the ring having a lesser number of passes of the audio cord extending through the ring;
ii) a wound storage configuration with the audio cord extending a shorter length than the longer length, and wound around the housing of the wireless audio receiver and through the ring and secured by the flexible band; and
iii) a clip configuration with the free ferromagnetic button of the distal free end of the band magnetically coupling to the fixed ferromagnetic button of the housing of the wireless audio receiver with the article of clothing therebetween.

19. The device in accordance with claim 17, wherein the flexible band is longer than distance from the attachment point to the fixed ferromagnetic button of the housing so that the flexible band bows in a convex arcuate shape when the free ferromagnetic button of the distal free end of the flexible band is magnetically coupled to the fixed ferromagnetic button of the housing.

20. The device in accordance with claim 17, further comprising an aperture in the housing, and the proximal end of the flexible band extending from inside the housing, and out of the aperture in the housing.

21. A wireless audio receiver device, comprising:
a) a housing with a wireless transceiver and a battery disposed therein;
b) an audio cord comprising an audio wire with a pair of earbuds at one end and an audio connection at an opposite end coupled to the housing;
c) a flexible band coupled to the housing at a proximal end and extending to a distal free end;
d) a flexible band extending from a proximal end coupled to the housing at an attachment point to a distal free end;
e) a free ferromagnetic button carried by the distal free end of the flexible band;
f) a fixed ferromagnetic button carried by the housing an spaced-apart from the attachment point of the flexible band;
g) the flexible band and the housing forming a ring for enclosing and securing a portion of the audio cord wound around the housing of the wireless audio receiver and secured by the flexible band;
h) the flexible band and the housing forming a clip capable of gripping an article of clothing in the magnetic coupling; and
wherein the attachment point of the proximal end of the flexible band is located at one end of the housing, and the fixed ferromagnetic button is located at an opposite end of the housing, and the flexible band extends substantially a length of the housing.

* * * * *